United States Patent [19]

Motisi

[11] Patent Number: 5,336,075
[45] Date of Patent: Aug. 9, 1994

[54] APPARATUS FOR FILLING AN INJECTION MOLD

[75] Inventor: Stephen A. Motisi, Hampshire, Ill.

[73] Assignee: D & M Plastics Corporation, Burlington, Ill.

[21] Appl. No.: 87,082

[22] Filed: Jul. 8, 1993

Related U.S. Application Data

[62] Division of Ser. No. 865,187, Apr. 8, 1992, Pat. No. 5,252,280.

[51] Int. Cl.⁵ .......................................... B29C 45/40
[52] U.S. Cl. ................................ 425/190; 425/192 R; 425/556; 425/573
[58] Field of Search ............... 425/121, 182, 185, 190, 425/192 R, 556, 573, 577; 264/161, 328.9, 328.12; 249/53, 64, 68, 102, 110

[56] References Cited

U.S. PATENT DOCUMENTS

| | | | |
|---|---|---|---|
| 2,424,235 | 7/1947 | Hoffer | 249/53 |
| 3,044,121 | 7/1962 | Wiskoff et al. | 249/68 |
| 4,861,534 | 8/1989 | Boehm et al. | 425/190 |

Primary Examiner—Tim Heitbrink
Attorney, Agent, or Firm—Mathew R. P. Perrone, Jr.

[57] ABSTRACT

An injection mold capable being filled from the center is a gated mold with at least one repositionable subgate. The subgate permits simplified removal of the central portion of the molded article, while at least substantially eliminating secondary treatment of the molded article.

9 Claims, 5 Drawing Sheets

APPARATUS FOR FILLING AN INJECTION MOLD

This is a division of U.S. patent application Ser. No. 07/865,187, filed Apr. 8, 1992, U.S. Pat. No. 5,252,280.

This invention relates to an apparatus and method for filling an injection mold and more particularly to an apparatus and method for filling an injection mold having repositionable gates to assist in the filling of a mold.

BACKGROUND OF THE INVENTION

Plastic components, having a wide variety of applications, are produced from modern, state of the art, engineering grade molding resins. Typical of these resins used in a molding process are polyphthalamide available under the trademark AMODEL from AMOCO, Inc., of Chicago, Ill.; polycyclohexylenedimethyleneterephthalate available under the trademark EKTAR from Eastman Kodak, Inc. of Rochester, N.Y.; polyphenylene sulfide available under the trademark RYTON from Phillips Petroleum, Inc. of Bartlesville, Okla.; and liquid crystal polymer available under the trademark VECTRA from Celanese, Inc. of Wilmington, Del.

Molding conditions for plastic molded component parts from these and similar resins are subject to many variable and stringent quality constraints or requirements not usually common to plastic components produced from standard commodity grade molding resins. Among those requirements for the molded products are (1) very high strengths, (2) resistance to high ambient heat, (3) exceptional co-planarity requirements especially in the electronic components field, (4) exceptionally tight "as molded" tolerances and (5) greatly reduced dimensional variability around a specified standard in the as molded state.

In order to achieve these stringent goals, and to meet the mandated requirements of today's sophisticated injection molded component customer; the plastics industry has produced increasingly complex and difficult to process molding resins. The current industry trends indicate that there will not be a lessening, but instead, an ever increasing list of physical demands placed on injection molded parts. Consequently, tremendous increases in both the complexity and tightened processing parameters of engineering grade molding resins are virtually assured.

These critical requirements are complicated by a number of additional factors. Ever higher loadings of reinforcing materials such as; glass fibers, ARAMID (ARAMID being a registered trademark of AMOCO, Inc. of Chicago, Illinois) fibers, carbon fibers, ceramics, magnetic fillers, mineral fillers, graphite fillers, and other fillers are commonly used in these parts. The added fillers reduce the viscosity of the melted resin, which is to be molded.

Each of these resins has an ideal set of conditions for processing or molding the resin. Reducing or tightening of the ideal processing window is caused by a number of factors including, but not limited to, process temperatures, processing pressures, heat degradation of the resin melt, and susceptibility to increased processing shear damage for highly engineered polymers. These resins are also desired to have a higher flex modulus or a higher notched Izod impact strength.

Other processing difficulties associated with today's increasingly complex and changeable engineering grade polymers are increased mold and tool wear and deterioration due to the abrasiveness of fillers. Higher concentrations of volatile and corrosive chemicals also result in accelerated corrosion and wear of mold components. These additives result in reduced ability to adequately, and consistently, fill individual mold cavities.

Higher injection pressures and faster resin melt injection rates do not compensate for these problems. These factors result in increased opportunity for damage to occur in ever smaller and more delicate, (especially in electronics applications), injection mold components resulting from highly reinforced engineering grade polymers. Increased importance of optimized resin melt delivery at a sufficient temperature to the respective mold cavity or cavities thus becomes clear.

In terms of processing consistency, today's plastic processor must be constantly aware of, and strive to improve upon, all variable and controllable segments of the plastic injection mold, and molding process. The processor must provide for optimized part quality by monitoring, and, where possible, controlling molding resin melt characteristics and conditions such as distance of melt travel in the mold, distance of melted resin travel in the cavity, directional control of resin melt stream, configuration of the part being molded, resin viscosity and reinforcement materials.

Heat is another important factor in molding. The first heat factor playing a part in molding relates to the melt temperature of the resin. Secondly, process induced heat from shear conditions produced by the molding machine and the mold configuration itself adds to the heat inherent in such a process. These heat factors must be carefully coordinated to avoid adverse effects on the molded resin, and the resultant deleterious effect on the molded product.

With the appropriate process and tooling controls, it is possible to eliminate, or control as much as possible, the location of flow or melt knit lines. By monitoring and controlling the above parameters, the molder is able to optimize part strength and part consistency, while both minimizing part warpage and tool wear and maximizing overall tool life. Such monitoring and controlling is highly difficult to accomplish in view of the other molding requirements.

One of the control methods employed by the molder, when economically feasible and warranted by high production volume is centralized resin melt delivery to the injection mold cavity. Centralized resin melt delivery is especially important in the case of high temperature, reinforced, engineering grade molding resins. These types of resins easily deteriorate under shear induced process heats. Also the reinforcement fibers contained therein are subject to damage when optimum flow characteristics are not achieved or are overlooked by the molder.

Two of the tool construction methods used to accomplish central resin melt delivery to the cavity of the injection mold are commonly known as a "hot runner" or "runnerless" type molds, and three-plate molds. While the above types of injection molds are able to accomplish the task of central resin melt delivery to the mold itself, they normally rely on a conventional gating approach to accomplish the dispersion of resin melt within the cavity itself. This molding process typically results in a less than optimum delivery of the resin melt within the most important section of the injection mold, the mold cavity itself.

These problems become especially clear in a molded component with a hollow, or cored, through configuration, such as is found in a common electronic component called a pin grid array. This is an especially problematic condition. It is problematic due to induced stress and shear caused by the melt flow passing around the standing core section which forms the hole itself, as well as the multiplicity of small and delicate core pins found within the mold cavity.

One method of dispersing the resin melt within the cavity in a centralized and relatively consistent manner throughout the mold cavity is by use of the fan gate or diaphragm type gate method. This type of gating, while providing an acceptably uniform dispersion of the resin melt within the cavity itself, requires expensive, time consuming trimming or die cutting of each individual molded plastic component. Additionally, construction and ongoing maintenance of costly trim fixtures or dies is required.

Thus, the molding of a suitable resin product causes a number of problems. The solution to one problem can and does create an additional problem or exacerbate another problem. The main objective is to minimize all problems, while maximizing product quality in the as-molded state, while at the same time, substantially minimizing or eliminating the post molding treatment.

SUMMARY OF THE INVENTION

Accordingly, among the many objectives of this invention, is to provide a gated injection mold capable of forming a synthetic resin substrate for use in a solid state circuit.

A further objective of this invention is to provide a gated injection mold capable of forming a part having good part strength.

A still further objective of this invention is to provide a gated injection mold capable of forming a part having minimized part warpage.

Yet a further objective of this invention is to provide a gated injection mold capable of forming a part having good part consistency.

Also an objective of this invention is to provide a gated injection mold capable of forming a part with minimized tool wear.

Another objective of this invention is to provide a gated injection mold capable of forming a part with good overall tool life.

Still another objective of this invention is to provide a gated injection mold capable of forming a synthetic resin substrate for use in a solid state circuit, which minimizes or reduces or repositions flow melt lines.

Yet another objective of this invention is to provide a gated injection mold capable of forming a synthetic resin substrate for use in a solid state circuit, which avoids shear induced problems from process heat resin degrading conditions.

A further objective of this invention is to provide a gated injection mold capable of reducing melt travel in the mold.

A still further objective of this invention is to provide a gated injection mold capable of reducing melt travel in the cavity.

Yet a further objective of this invention is to provide a gated injection mold capable of minimizing the effect of a reinforcement material in the resin.

Also an objective of this invention is to provide a gated injection mold capable of forming a part with very high strength.

Another objective of this invention is to provide a gated injection mold capable of forming a part with good resistance to high ambient heat.

Still another objective of this invention is to provide a gated injection mold capable of forming a synthetic resin substrate for use in a solid state circuit, which has exceptional co-planarity requirements.

Yet another objective of this invention is to provide a gated injection mold capable of forming a synthetic resin substrate for use in a solid state circuit, which has exceptionally tight as molded tolerances.

A further objective of this invention is to provide a gated injection mold capable of having greatly reduced dimensional variability around a specified standard in the as molded state.

A still further objective of this invention is to provide a gated injection mold with an improved control of the processing window.

Yet a further objective of this invention is to provide a gated injection mold capable of forming a part having good part consistency.

Also an objective of this invention is to provide a gated injection mold capable of forming a part designed to have a high flex modulus.

Another objective of this invention is to provide a gated injection mold capable of forming a part with high Izod impact strength.

Still another objective of this invention is to provide a gated injection mold capable of forming a synthetic resin substrate for use in a solid state circuit at reduced injection pressures.

Yet another objective of this invention is to provide a gated injection mold capable of forming a synthetic resin substrate for use in a solid state circuit at a faster resin melt injection rate.

A further objective of this invention is to provide a method of shaping in a gated injection mold capable of forming a part having good part strength.

A still further objective of this invention is to provide a method of shaping in a gated injection mold capable of forming a part having minimized part warpage.

Yet a further objective of this invention is to provide a method of shaping in a gated injection mold capable of forming a part having good part consistency.

Also an objective of this invention is to provide a method of shaping in a gated injection mold capable of forming a part with minimized tool wear.

Another objective of this invention is to provide a method of shaping a plastic component in a gated injection mold with good overall tool life.

Still another objective of this invention is to provide a method of shaping in a gated injection mold capable of forming a synthetic resin substrates for use in a solid state circuit, which minimizes or reduces or repositions flow melt lines.

Yet another objective of this invention is to provide a method of shaping in a gated injection mold capable of forming a synthetic resin substrate for use in a solid state circuit, which avoids shear induced problems from resin-degrading heat conditions.

A further objective of this invention is to provide a method of shaping in a gated injection mold capable of reducing melt travel in the mold.

A still further objective of this invention is to provide a method of shaping in a gated injection mold capable of reducing melt travel in the cavity.

Yet a further objective of this invention is to provide a method of shaping in a gated injection mold capable of minimizing the effect of a reinforcement filler damage in the resin.

Also an objective of this invention is to provide a method of shaping in a gated injection mold capable of forming a part with very high strength.

Another objective of this invention is to provide a method of shaping in a gated injection mold capable of forming a part with good resistance to high ambient heat.

Still another objective of this invention is to provide a method of shaping in a gated injection mold capable of forming a synthetic resin substrate for use in a solid state circuit, which has exceptional co-planarity requirements.

Yet another objective of this invention is to provide a method of shaping in a gated injection mold capable of forming a synthetic resin substrate for use in a solid state circuit, which has exceptionally tight as molded tolerances.

A further objective of this invention is to provide a method of shaping in a gated injection mold capable of having greatly reduced dimensional variability around a specified standard in the as molded state.

A still further objective of this invention is to provide a method of shaping an article in a gated injection mold with a broad processing window parameter.

Yet a further objective of this invention is to provide a method of shaping in a gated injection mold capable of forming a part having good part consistency.

Also an objective of this invention is to provide a method of shaping in a gated injection mold capable of forming a part designed to have a high flex modulus.

Another objective of this invention is to provide a method of shaping in a gated injection mold capable of forming a part with high Izod impact strength.

Still another objective of this invention is to provide a method of shaping in a gated injection mold capable of forming a synthetic resin substrate for use in a solid state circuit at reduced injection pressures.

Yet another objective of this invention is to provide a method of shaping a part using a gated injection mold capable of forming a synthetic resin substrate for use in a solid state circuit at a faster resin melt injection rate.

These and other objectives of this invention (which other objectives become clear by considering the specification, claims and drawings as a whole) are met by providing a gated mold with at least one repositionable subgate. The subgate permits simplified removal of the central portion of the molded article, while at least substantially eliminating secondary treatment of the molded article.

BRIEF DESCRIPTION OF THE DRAWINGS

Throughout the figures of the drawings, where the same part appears in more than one figure, the same number is assigned thereto.

DESCRIPTION OF THE PREFERRED EMBODIMENTS

A programmable, subgated mold provides for the production of uniform, high temperature plastic molded products. By filling the mold from the center through a primary gate and a plurality of subgates, it is possible to efficiently fill the mold in minimal time with minimal loss of resin temperature.

The design, construction and process of tooling, and or molding of a plastic molded product, is directed to, but not limited to, production of ventilated pin grids, or cored through plastic injection molded parts. Utilizing, modular or programmable, single or multi, subgated feeder pad or pads to the inside wall section or sections of ventilated or cored through mold efficiently forms plastic injection molded parts.

With the structure of this mold, the tool builder or molder may create, construct and employ a suitable molded element. The mold provides a highly variable, flow pattern with a programmable system to introduce and disperse, in a particular pattern, the flow of resin melt into a specific cavity or cavities in a plastic injection mold.

Otherwise difficult to mold resins or plastics are operable herein. The particular mold design is applicable to an engineering grade plastic or resin, or to a high temperature plastic resin. The mold of this invention is designed to be filled with a resin at a lower pressure and a lower temperature than is customary in the art. To reduce the temperature of the resin being molded reduces the chance of flash or gas entrapment in the resin, thereby making a greatly improved plastic component. There is also less chance of deflecting or breaking the pins used to form a pin grid for a circuit board.

The particular structure of the mold with the plurality of subgates provides for a greater coplanarity of the plastic component. With this equalized filling of the mold and equalized cooling of the resin, the warpage of the part molded from the plastic is reduced and coplanarity is greatly improved. With the substantially equalized filling through the subgates, the cooling is substantially even and avoids the warpage. A flatter plane and part with a finished edge is achieved with minimal or no further processing or finishing steps. These advantages greatly enhance the surface mount component assembly required in printed circuit board technology.

A standard warp deviation factor permitted for a printed circuit board substrate is 0.01 (0.004 inch) millimeter to 0.02 (0.008 inch) millimeter. If the deviation or warpage can be reduced below that level in a simple fashion, great advantages are obtained. This combination of the pin grid array, melt flow, center filling theme and subgate procedures accomplishes this process in a very efficient fashion.

Additionally by minimizing the melt travel in the mold for the plastic, the temperature is maintained at a more constant level. With the temperature at a more constant level, the desired product is molded more efficiently and achieves the desired results. It is highly desirable to mold plastic devices suitable for holding integrated circuit chips. It is also desirable to have these boards or plastic devices apertured.

By having the plastic resin at an appropriate temperature and flowing at the appropriate rate, the apertures formed therein by the core pin structures can be uniformly maintained and controlled so that the aperture tolerances are within accepted levels. There is great difficulty in getting plastic to the appropriate point. If the plastic is subjected to an extremely high temperature, the integrity of the plastic resin may be compromised and the flow of the plastic may not be appropriate. If the plastic temperature is too low, the plastic resin may be too viscous and bend some of the core pins which can destroy the integrity of the pin grid array.

Figure 1:
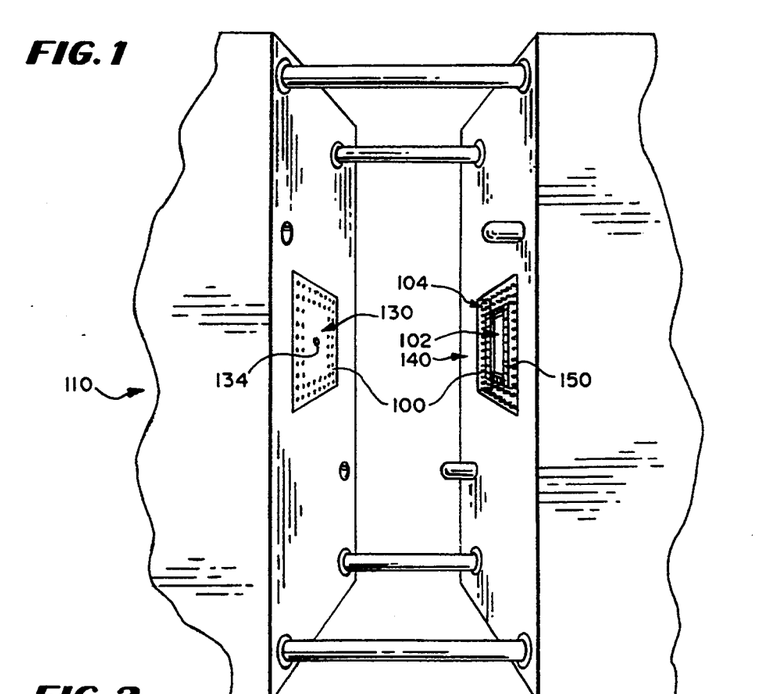
FIG. 1 depicts a die assembly 100 for use in this invention inserted in an injection mold 110.

Referring now to FIG. 1, the die assembly 100 is shown as being assembled within injection mold 110. Die assembly 100 includes primary gated member 130 and subgated member 140, which are pushed together into adjoining fashion. When die assembly 100 is adjoining, a center cavity 102 is provided in the center thereof and a forming cavity 104 is provided around center cavity 102. Center cavity 102 is separated from forming cavity 104 by a plurality of inner wall defining members 150.

The injection mold 110 holds the die assembly 100 in an adjoining situation and permits the resin or plastic to be injected through primary gate 134 in primary gated member 130 thereby forming the desired part. For a core-through part, the part in center cavity 102 is usually discarded, while the part in forming cavity 104 is usually the desired product.

Figure 2:
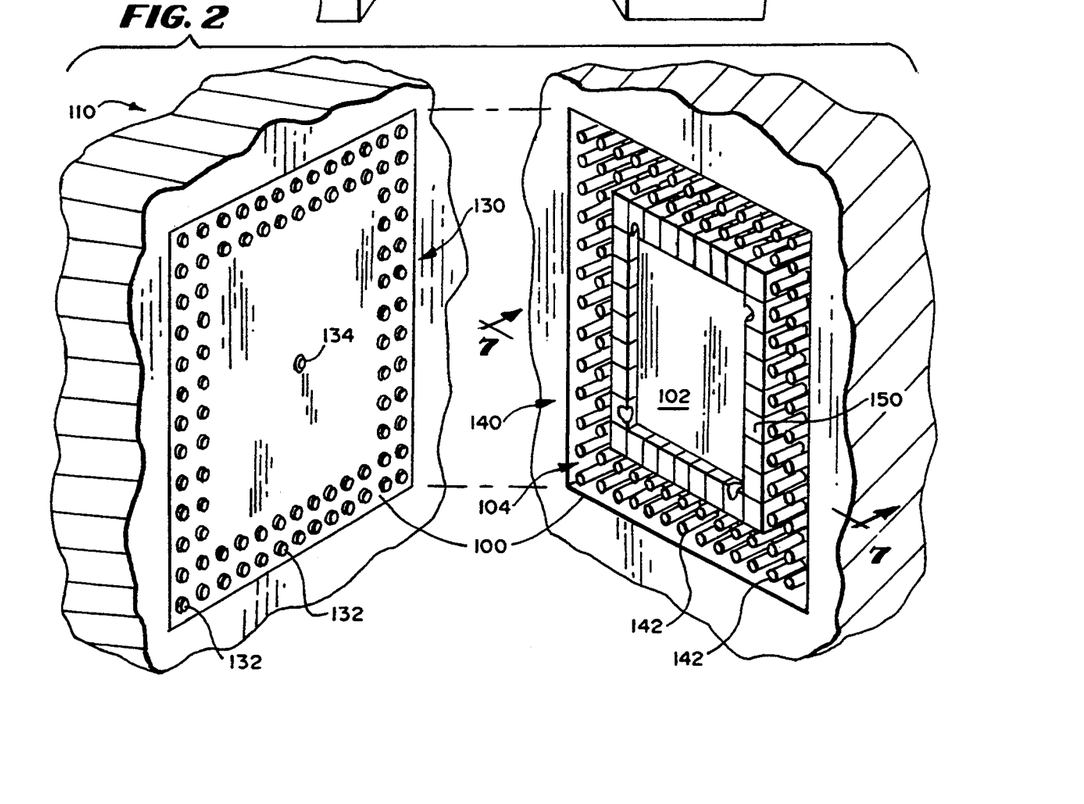
FIG. 2 depicts an enlarged view of the die assembly 100 with primary gated member 130 and subgated member 140 of die assembly 100.
Figure 3:
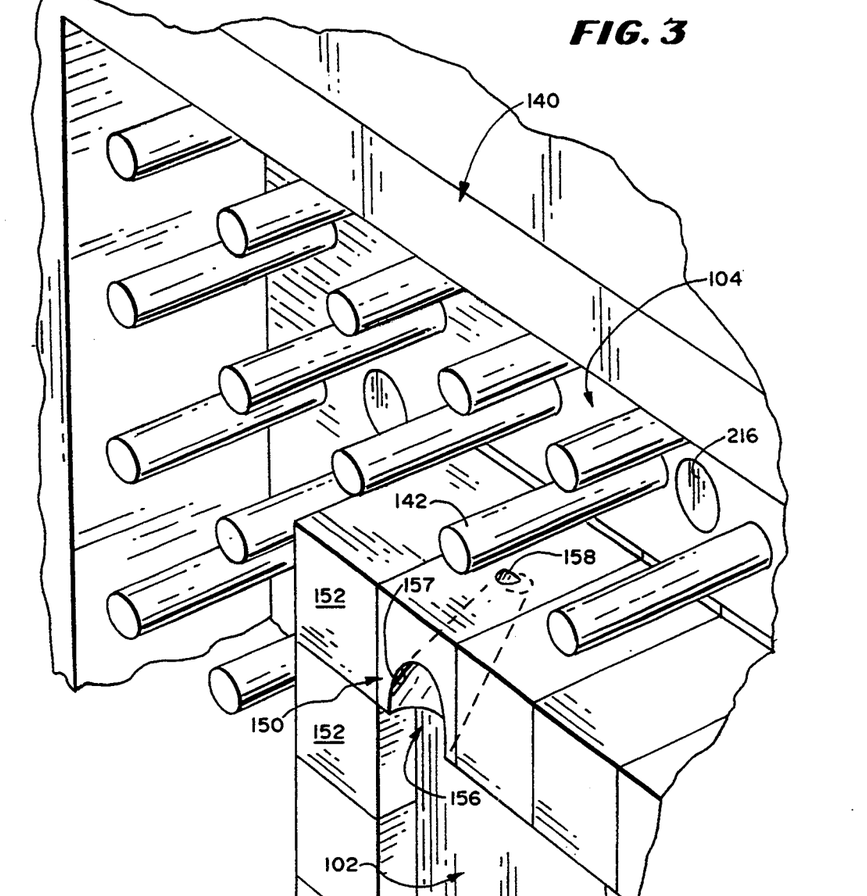
FIG. 3 is a closeup view of a corner of subgated member 140.
Figure 4:
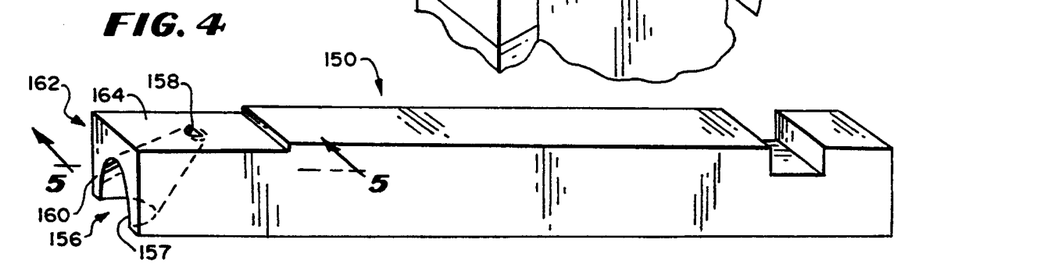
FIG. 4 is a perspective view of gated piece 150.

In FIG. 2, a close up of the die assembly 100 is depicted. The die assembly 100 includes the primary gated member 130 and the subgated member 140. The primary gated member 130 has a plurality of pin receiving buttons 132 capable of meshing with subgated member 140. Pin receiving buttons 132 are situated in forming cavity 104.

Located within subgated member 140 are rams 216 capable of providing a method for ejecting the molded piece 210 (shown in FIG. 12) from the injection mold 110. These rams 216 are located within cavity 104.

Each pin receiving button 132 is a raised member capable of receiving a pin 142 therein. Pins 142 are situated on subgated member 140 and are within forming cavity 104. Each pin 142 is a rod-like structure having a generally circular cross-section. Any suitable cross-section for pin 142 may be operable. Each pin 142 creates an aperture as long as the thickness of the molded piece for the pin grid array formed therein.

Figure 5:
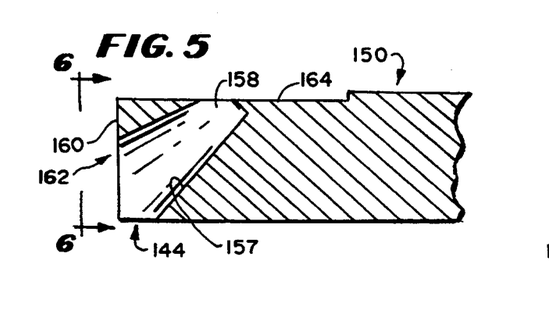
FIG. 5 is a cross-section of FIG. 4 along Line 5—5.
Figure 6:
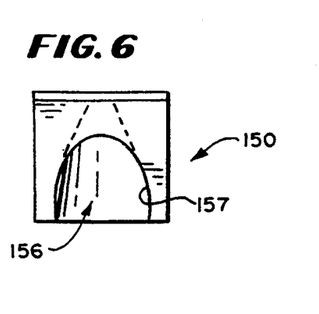
FIG. 6 depicts an end view of FIG. 5 along Line 6—6.
Figure 7:
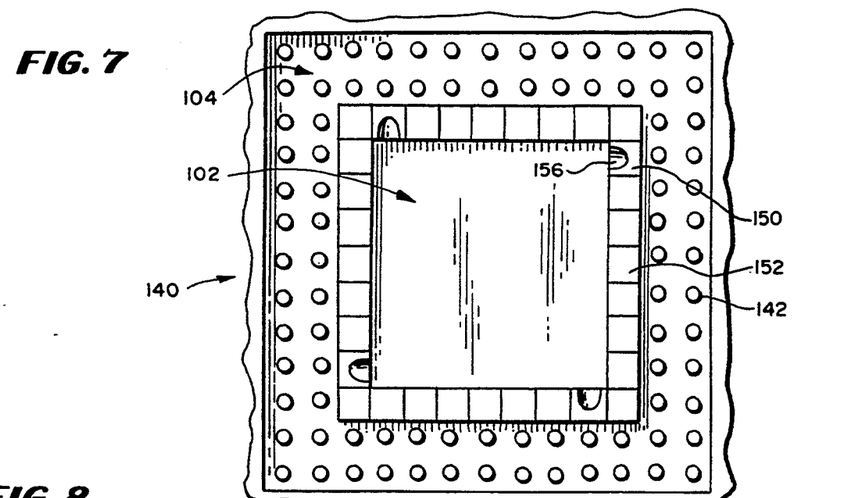
FIG. 7 depicts a frontal view of subgated member 140 along Line 7—7 of FIG. 2.

Each pin 142 engages a pin receiving button 132 when the primary gated member 130 and the subgated member 140 are placed adjacent to each other. The resin or other material flows through a primary gate 134 into the center cavity 102, and then through subgate 144 (shown in FIG. 5) on each subgated member 140. In this manner, the resin center cavity 102 and forming cavity 104 fill with a material to be molded. Each subgate 144 in a subgate 152 communicates with center cavity 102 and forming cavity 104.

Figure 12:
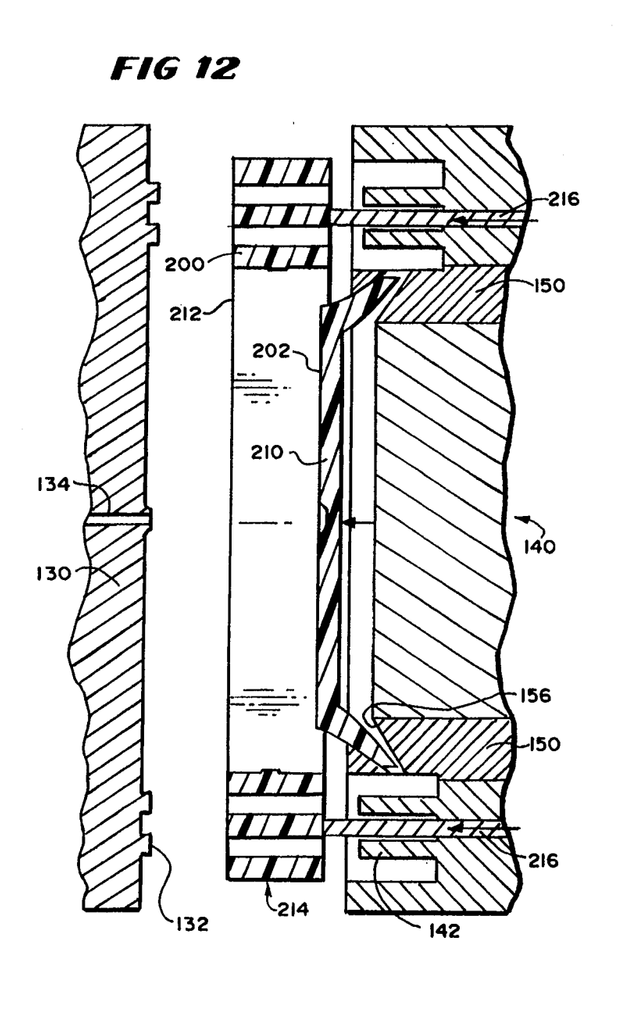
FIG. 12 depicts the separation of the molded piece 200 from the subgated member 140 and the removal of the sheared away center section 210 of the molded piece 200 from the subgated member 140 to generate a desired finished product 212.

The pins 142 combine with pin receiving buttons 132 to provide for apertures in a molded member, especially in a pin grid array. Each subgate 144 permits molding material flow into forming cavity 104 and around pins 142. Each pin 142 combined with a pin receiving button 132 forms a clean cut aperture 214 in molded product 212 (FIG. 12). Each subgate 144 combines with the other subgate or subgates 144 to provide for an even resin flow around each pin 142 to form the pin grid array.

Subgated member 140 includes at least one gated piece 150 therein. Gated piece 150 is surrounded by a plurality of solid wall defining members in the form of subgate 152. The mold blocks 152 set forth the pattern and shape of the center piece 210 of the molded product 212. Each subgate 144 provides for receipt of the resin or other moldable material therethrough.

When considering FIG. 2, FIG. 3, FIG. 4, FIG. 5, FIG. 6, FIG. 7 and FIG. 8, each gated piece 150 has an enlarged opening 156 adjacent the center cavity 102 and a narrowed opening 158 adjacent to the forming cavity 104. Enlarged opening 156 narrowed opening 158 combine to form a cone-like structure 157. This structure permits resin or other moldable material to flow into center cavity 102, through enlarged opening 156, out of narrowed opening 158 and into forming cavity 104. Narrowed opening 158 is adjacent to the forming cavity 104 and is preferably D-shaped.

Forming cavity 104 includes pins 142. Enlarged opening 156 is a frontal portion is generally shaped like a funnel. Enlarged opening 156 tapers down to narrowed opening 158.

Enlarged opening 156 of gate 144 preferably includes a pair of generally D-shaped openings, positioned perpendicularly to each other at a corner of piece 150 which faces into mold section 102 at upper perpendicular portion 160 in a mold end 162 of gated piece 150 and lower perpendicular portion 164 in gated base 166 of gated piece 150. From these portions the gate 144 tapers to narrowed opening 158. In this fashion, efficient flow of resin is achieved and proper separation of the center core 212 of the molded article is achieved.

Figure 8:
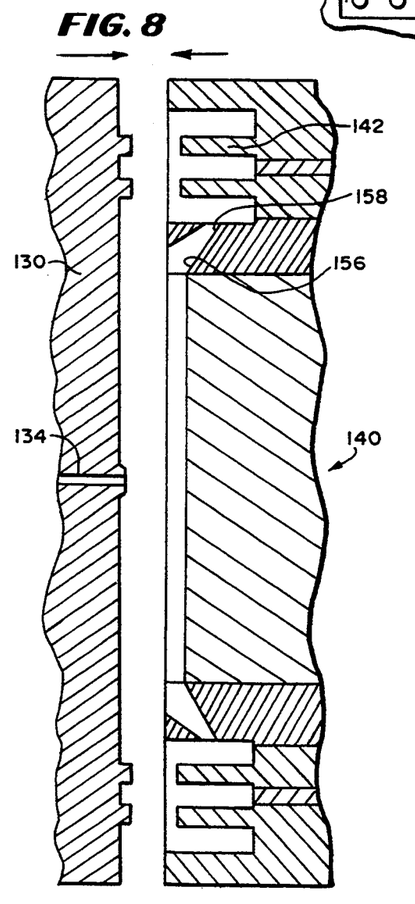
FIG. 8 depicts a side cross-sectional view of primary gated member 130 approaching subgated member 140.
Figure 9:
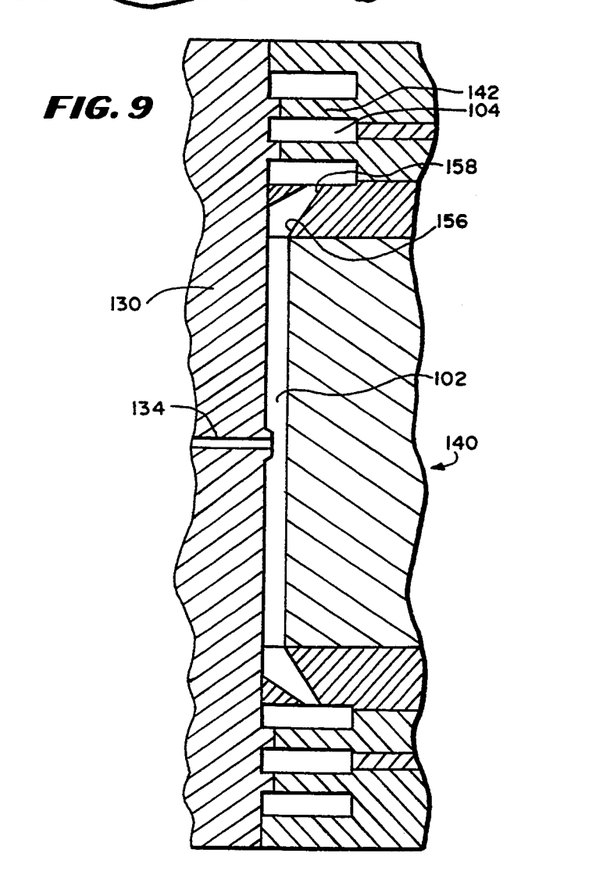
FIG. 9 depicts an primary gated member 130 and a subgated member 140 adjacent to each other ready to receive a plastic resin.
Figure 10:
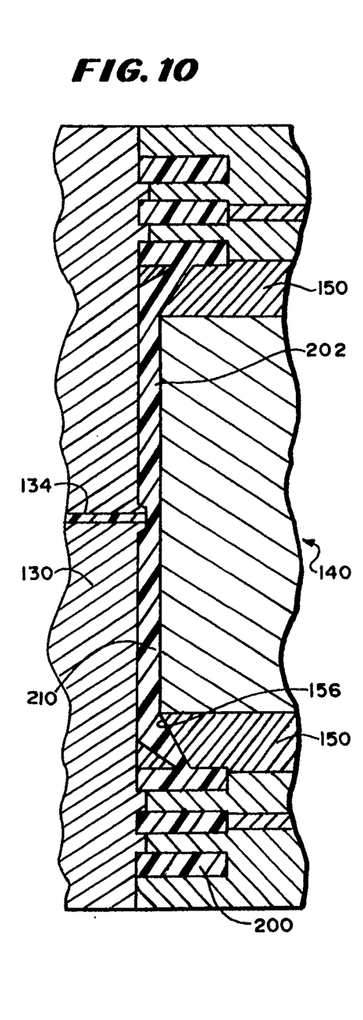
FIG. 10 depicts FIG. 9 with plastic resin 202 therein.
Figure 11:
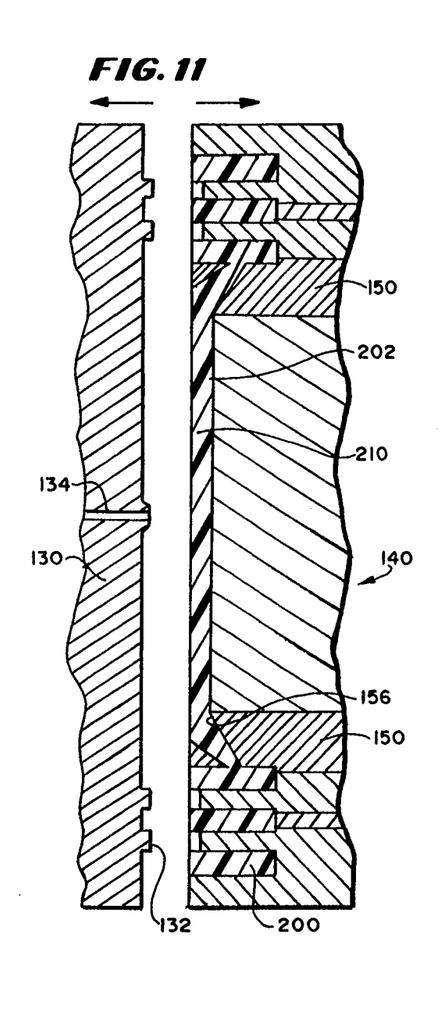
FIG. 11 depicts the separation of primary gated member 130 and subgated member 140 after the molding is complete.

Referring now to FIG. 8, FIG. 9, FIG. 10, FIG. 11, and FIG. 12, the molding process is depicted. In FIG. 8 primary gated member 130 is shown as approaching subgated member 140. When the members 130 and 140 abut, each pin 140 fits into a pin receiving button 132. Resin is then injected through primary gate 134, and flows into center cavity 102. Then the resin flows through each subgate 144 in the gated piece 150 into the forming cavity 104 to form the molded piece 210. The injection mold 110 may then be separated.

As the ram 216 or plurality of rams pushes the molded article 210 out of mold member 140, the structure of the gated member 150 uniformly separates center portion 212 from the remaining molded piece 214. The structure of gated member 150 with the narrowed opening 158 of the subgate 144 adjacent the forming cavity 104 creates a sufficient separation by shearing so as to avoid any further treatment of the molded piece 214.

Figure 13:
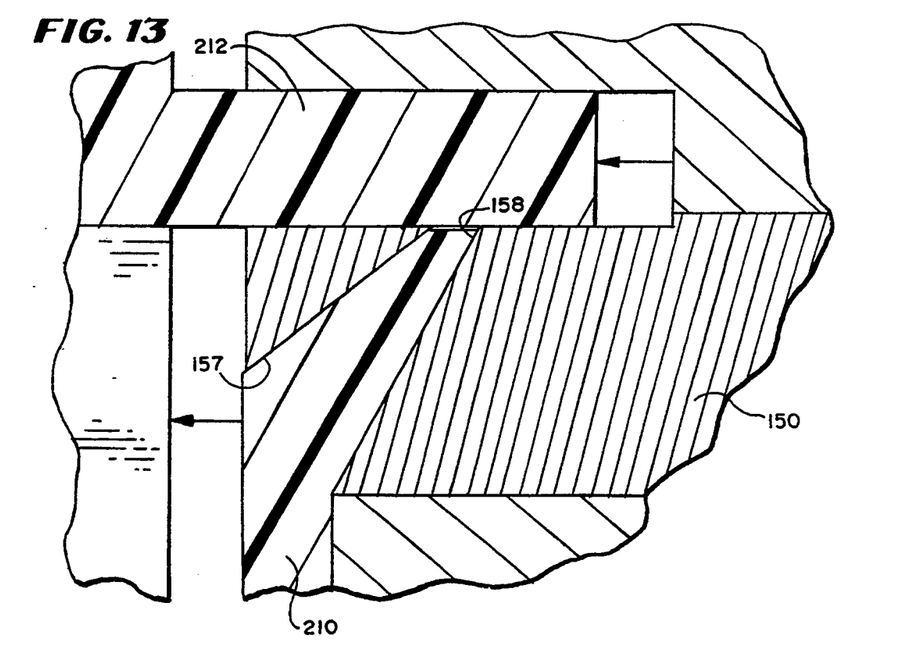
FIG. 13 depicts a cross-section of the separation procedure and the severing of the center piece 210 from the desired printed circuit product 212.
Figure 14:
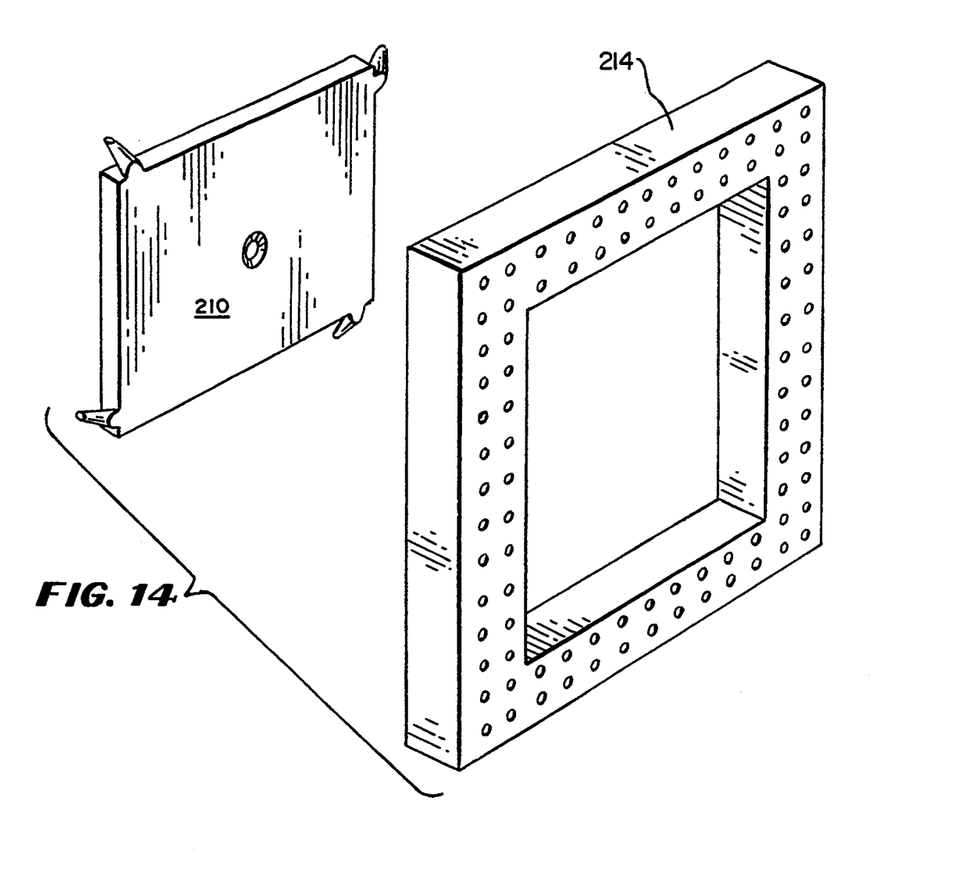
FIG. 14 depicts an exploded view of the molded piece 200 having the printed circuit product 212 separated from the center piece 210.

FIG. 13 clearly depicts a close up version of that showing such a separation of center portion 212 from molded piece 214. In FIG. 14, the center piece 212 is shown as clearly separated from the desired molded piece 214. The molded piece 214 is so clean and so neat due to the structure of the subgates 156, that little or no further treatment is necessary to form a molded piece 214 into a pin grid array.

This application taken as a whole with the specification, abstract, and drawings provides sufficient information for a person having ordinary skill in the art to practice the invention herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. An injection mold for producing a molded article, said injection mold comprising:
   a die assembly including a primary gated member and a subgated member;
   said primary gated member and said subgated member being movable to an adjoining position;
   said adjoining position providing a center cavity and a forming cavity around said center cavity;
   a plurality of inner wall defining members positioned on said subgated member, said inner wall defining members separating said center cavity from said forming cavity, at least one of said inner wall defining members being a respositionable subgate providing communication between said center cavity and said forming cavity, said at least one repositionable subgate including means to permit simplified removal of a central portion of the molded article formed by said center cavity; and
   a core pin structure being situated in said forming cavity.

2. The injection mold of claim 1, wherein:
   said forming cavity forms a desired product; and
   said center cavity forms a discardable part.

3. The injection mold of claim 2, wherein:
   said center cavity includes a primary gate for receiving a moldable material therethrough.

4. The injection mold of claim 3, wherein:
   said core pin structure comprising a plurality of pins mounted on said subgated member; and
   a plurality of pin receiving buttons on said primary gated member; and
   each pin being matable with a corresponding pin receiving button.

5. The injection mold of claim 4, wherein:
   said at least one respositionable subgate has an enlarged opening adjacent to said center cavity, and
   has a narrowed opening adjacent to said forming cavity.

6. The injection mold of claim 5, wherein:
   said enlarged opening and said narrowed opening combine to form a conical structure;
   said narrowed opening being D-shaped; and
   said enlarged opening having a funnel shape.

7. The injection mold of claim 6, wherein:
   said enlarged opening includes a pair of generally D-shaped openings, positioned perpendicularly to each other at a corner of said at least one respositionable subgate; and
   said primary gated member includes at least one ram capable of ejecting said molded article from said injection mold.

8. The injection mold of claim 7, wherein:
   said at least one ram is located within said forming cavity;
   each pin receiving button being a raised member capable of receiving said corresponding pin; and
   each pin being a rod structure.

9. The injection mold of claim 8, wherein:
   said moldable material flows through said primary gate into said center cavity and then through said at least one repositionable subgate;
   said pins forming a pin grid array; and
   said ram causes cooperates with said at least one repositionable subgate to uniformly separate said central portion from the molded article, thereby creating a sufficient separation by shearing to avoid further treatment of said molded article.

* * * * *